(12) United States Patent
Del Corso et al.

(10) Patent No.: US 8,968,524 B2
(45) Date of Patent: Mar. 3, 2015

(54) METHOD FOR FABRICATING DIVIDED WALL COLUMNS

(75) Inventors: Fabrice Del Corso, Saclay (FR); Golo Zick, Grenoble (FR)

(73) Assignee: L'Air Liquid Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 762 days.

(21) Appl. No.: 13/060,093

(22) PCT Filed: Jul. 10, 2009

(86) PCT No.: PCT/EP2009/058816
§ 371 (c)(1),
(2), (4) Date: May 4, 2011

(87) PCT Pub. No.: WO2010/025980
PCT Pub. Date: Mar. 11, 2010

(65) Prior Publication Data
US 2011/0290634 A1    Dec. 1, 2011

(30) Foreign Application Priority Data

Sep. 3, 2008 (EP) .................................... 08305520

(51) Int. Cl.
*B01D 3/32* (2006.01)
*B23P 17/00* (2006.01)
*F25J 3/00* (2006.01)
*B01D 3/14* (2006.01)
(Continued)

(52) U.S. Cl.
CPC *B01D 3/32* (2013.01); *B01D 3/141* (2013.01);
*F25J 3/04939* (2013.01); *F25J 3/0295* (2013.01); *F25J 2200/96* (2013.01); *F25J 2290/42* (2013.01)
USPC .................. 203/99; 29/17.1; 29/17.2; 29/425; 29/428; 29/890.09; 196/111; 196/115; 196/133; 202/154; 202/158; 261/128; 62/121

(58) Field of Classification Search
USPC .................... 29/17.1, 17.2, 425, 428, 890.09; 196/111, 115, 133; 202/154, 158; 203/99; 261/128; 62/121
See application file for complete search history.

(56) References Cited

U.S. PATENT DOCUMENTS

| 4,230,533 A | 10/1980 | Giroux | |
|---|---|---|---|
| 4,496,430 A * | 1/1985 | Jenkins | 202/158 |

(Continued)

FOREIGN PATENT DOCUMENTS

| DE | 4336983 | 5/1995 |
|---|---|---|
| DE | 4336986 | 5/1995 |

(Continued)

OTHER PUBLICATIONS

PCT Search Report for PCT/EP2009/058816.
(Continued)

*Primary Examiner* — Virginia Manoharan
(74) *Attorney, Agent, or Firm* — Justin K. Murray

(57) ABSTRACT

The invention relates to a method producing a portioned column by forming a first segment and a third segment into arcuate segments, and attaching these arcuate segments to a second z-shaped segment to from two contiguous volumes with approximately semi-circular cross-sections that combine to form a partitioned, approximately cylindrical segment.

16 Claims, 6 Drawing Sheets

(51) Int. Cl.
*F25J 3/04* (2006.01)
*F25J 3/02* (2006.01)

(56) References Cited

U.S. PATENT DOCUMENTS

| | | | |
|---|---|---|---|
| 5,914,012 | A | 6/1999 | Kaibel et al. |
| 6,958,111 | B2 | 10/2005 | Rust et al. |
| 7,287,747 | B2 * | 10/2007 | Zich et al. ............ 261/114.5 |
| 8,480,860 | B2 * | 7/2013 | Kovak ....................... 202/258 |
| 2001/0052453 | A1 | 12/2001 | Rust et al. |
| 2008/0088042 | A1 * | 4/2008 | Zone et al. ................. 261/94 |

FOREIGN PATENT DOCUMENTS

| | | |
|---|---|---|
| JP | 09-210261 | 8/1997 |
| JP | 2000-034921 | 2/2000 |
| JP | 2002-159802 | 6/2002 |
| JP | 2003-106146 | 4/2003 |
| WO | 1999001193 | 1/1999 |

OTHER PUBLICATIONS

JP Office Action mailed Sep. 3, 2013, JP Application No. 2011-525478 (3 pps).

* cited by examiner

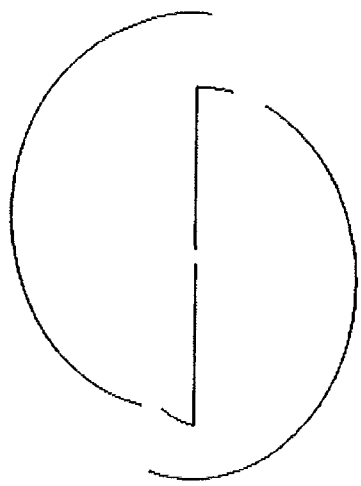
Figure 5a
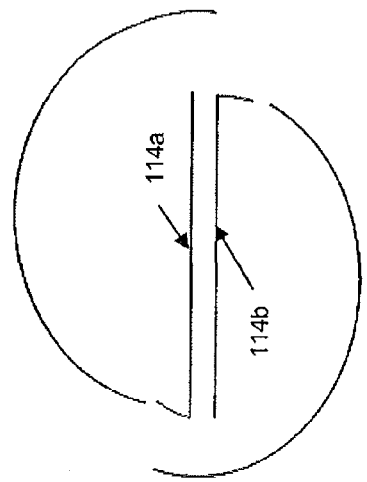
Figure 5c
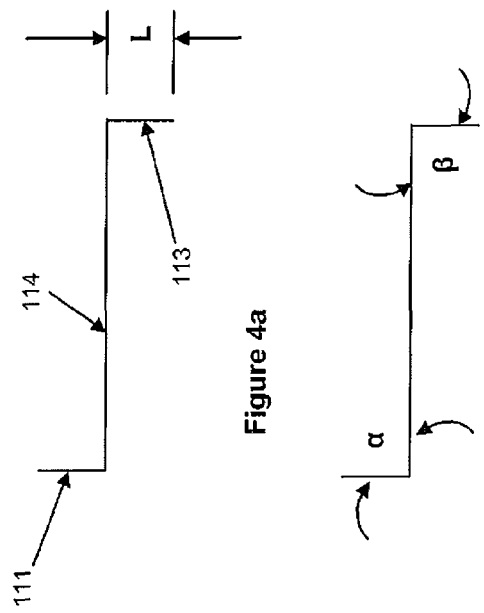
Figure 4a
Figure 4b
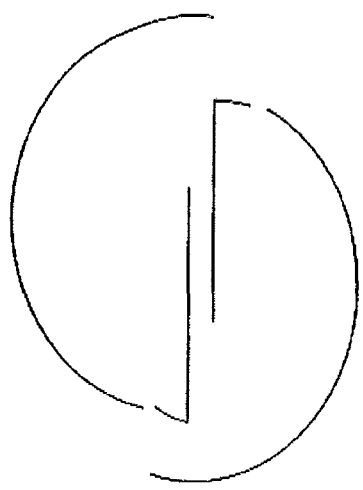
Figure 5b

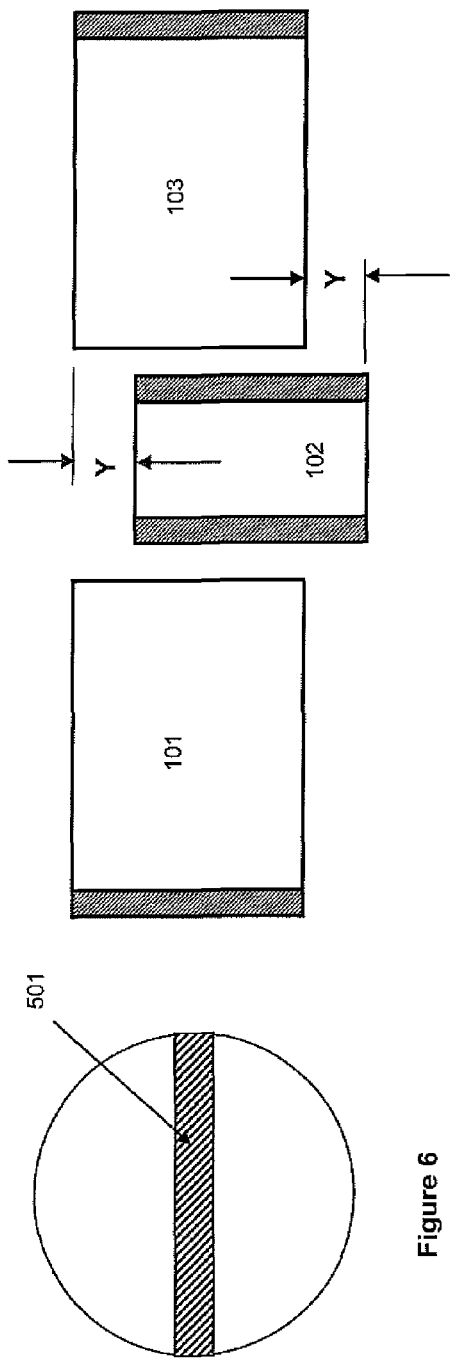
Figure 7a
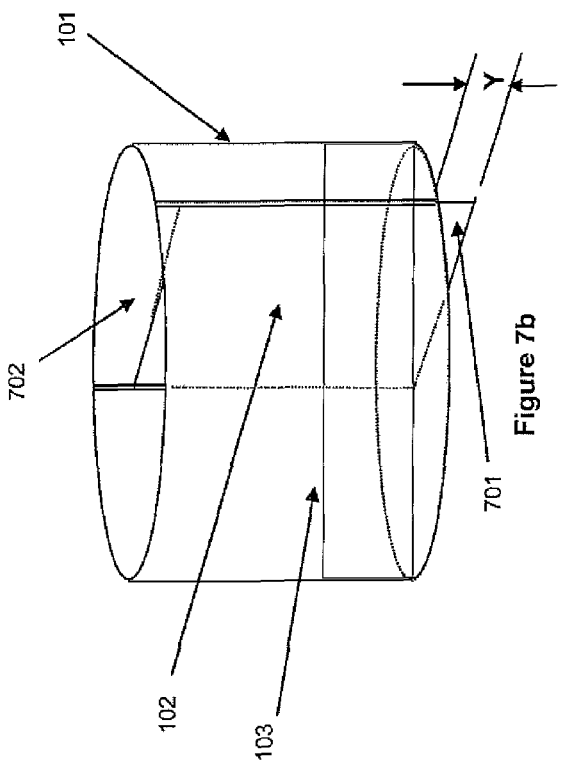
Figure 7b
Figure 6

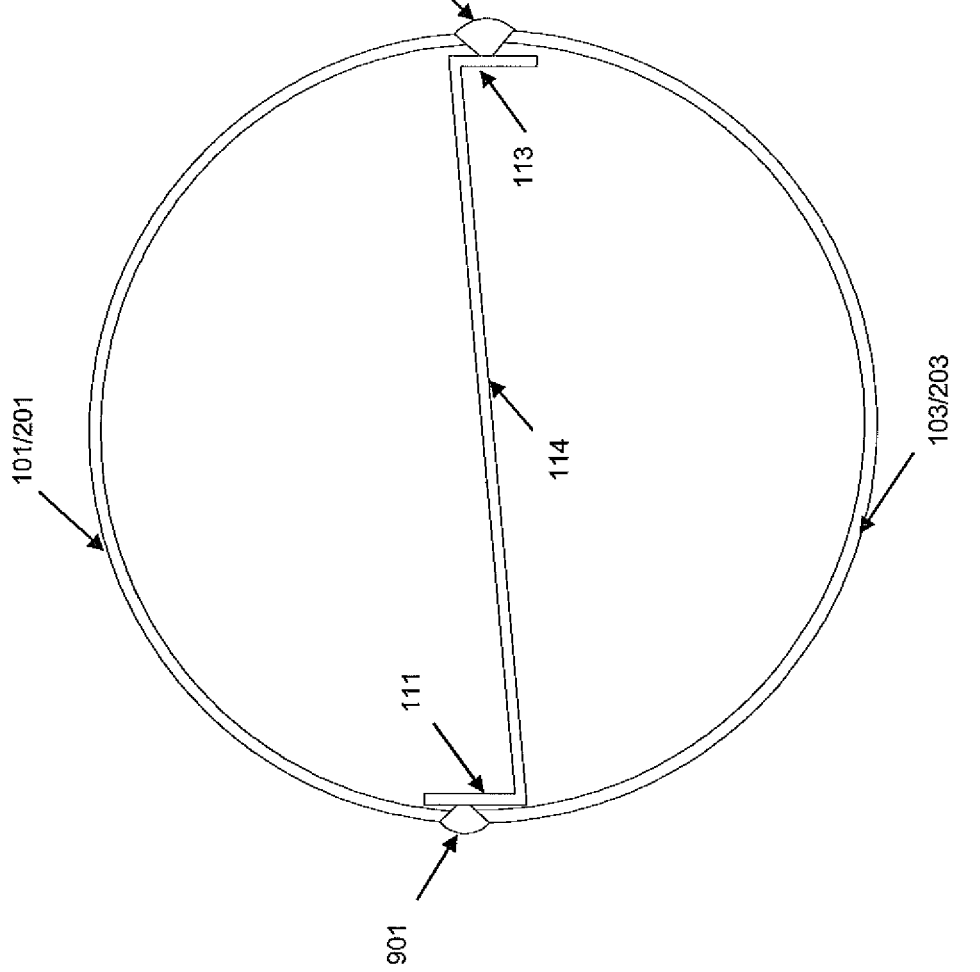

METHOD FOR FABRICATING DIVIDED WALL COLUMNS

This application is a §371 of International PCT Application PCT/EP2009/058816, filed Jul. 10, 2009.

FIELD OF THE INVENTION

The present invention relates to a method for fabricating divided wall columns.

BACKGROUND

Distillation columns have, of course, been widely used to perform separations of all types in different industrial applications. Over fifty years ago, it was proposed to replace two distinct distillation columns with a single distillation column having a vertical partition (dividing wall column) within the column. This single, divided wall column could effect the separation of the column feed into three constituent fractions. It was recognized then that a dividing wall column could reduce, or minimize, the size or cost of the equipment needed to produce overhead, bottoms, and sidedraw products.

Control systems for dividing wall distillation columns have been known since at least 1980, when U.S. Pat. No. 4,230,533 described a dividing wall distillation column and its control system. In the late 1990's, control systems for dividing wall distillation columns have been studied in further detail by researchers.

Despite the advantages of the dividing wall column and despite much research and study, the processing industry has long felt reluctant to use dividing wall columns in commercial processes. This widespread reluctance has been attributed to various concerns, including control problems, operational problems, complexity, simulation difficulties, and lack of design experience. General guidelines and considerations when substituting a dividing wall column for conventional columns have been established. Nevertheless, there are relatively few documented practical uses of dividing wall columns in commercial plants.

It is known, for example, to provide a partition in such a column to thereby subdivide the interior of the column into an inlet region and a discharge region. The partition in this system serves to prevent transverse mixing of liquid and/or vapor streams over a limited height of the column. The apparatus reduces the number of distillation columns required for the separation of multicomponent feed stocks.

The partitions can extend between opposite walls of the column and can have heights which, as a rule, can be greater than the column diameter and can be at least equal to the spacing between individual horizontal bottoms of the column. The use of continuous partitions has, however, a number of drawbacks and these drawbacks are the more serious the greater the diameter of the column.

The incorporation of a one-piece partition in the column is difficult because of its weight and the need for a close fit of the partition in the column. From a certain size, the dimensions of such partitions ensures that they can only be handled with mechanical assistance which can lead to additional costs. Furthermore, with increasing weight, the partitions can pose a greater danger for the workers who are necessary for installation of the partition. It has been found in practice that the partition can easily become canted during installation in the column and can thereby damage the inner wall of the column or result in poor sealing between the column and the partition. Irregularities in the shape of the column can also limit the sealing effectiveness. Since possible nonsealing regions may then have to be sealed up by additional acts, the costs of the column and the partition can be prohibitive.

SUMMARY OF THE INVENTION

It is therefore the object of the present invention to propose fabrication methods adapted to present and future processes involving dividing wall columns for the transfer of gas/liquid material that serve to integrate a plurality of columns in the same shell in order to reduce the fabrication costs.

A further object of the present invention is to propose fabrication methods for divided wall columns for the transfer of gas/liquid material that serve to integrate a plurality of columns in the same shell in order to reduce the separation energy required.

For this purpose, the invention relates to a method of producing a partitioned column segment, comprising a first sheet metal segment, a second sheet metal segment, and a third sheet metal segment. The first sheet metal segment comprises a first edge, and a second edge. The second sheet metal segment comprises a third edge, and a fourth edge. The third sheet metal segment comprises a fifth edge, and a sixth edge. The second edge is attached to said third edge, and the fourth edge is attached to said fifth edge. The method comprises forming said first segment into a first arcuate bend in a first direction, wherein adjacent to said first edge comprises a first distal region. The method comprises forming said second segment into a z-shaped bend, wherein said z-shape consists of a first proximal region, a central region, and a second proximal region. The method comprises forming said third segment into a second arcuate bend in a second direction, wherein adjacent to said sixth edge comprises a fourth distal region. The method comprises attaching said first distal region to said second proximate region, thereby producing a first approximately cylindrical segment, said first approximately cylindrical segment having an approximately semi-circular cross-section. And the method comprises attaching said second distal region to said first proximate region, thereby producing a second approximately cylindrical segment, said second approximately cylindrical segment having an approximately semi-circular cross-section.

In another embodiment, the arcuate bend is produced by rolling. In yet another embodiment, said second edge is attached to said third edge by being fabricated from the same sheet, and said fourth edge is attached to said fifth edge by being fabricated from the same sheet. In another embodiment said second edge is attached to said third edge by welding; and said fourth edge is attached to said fifth edge by welding. In yet another embodiment, at least one weld is a butt-weld. In another embodiment at least one weld is a lap-weld. In another embodiment, said second sheet metal segment comprises a thicker gauge metal than said first sheet metal segment and/or said third sheet metal segment.

In another embodiment, said first distal region is attached to said second proximate region by welding, and said second distal region is attached to said first proximate region by welding. In another embodiment, all welds are performed from the exterior of the said partitioned column. In yet another embodiment, said z-shaped bend has an angle α between said first proximal region and said central region, and said z-shaped bend has an angle β between said second proximal region and said central region. In another embodiment wherein said angle α is about 90 degrees, and wherein said angle β is about 90 degrees. In another embodiment said first proximal region has a length of about 30 mm, and said second proximal region has a length of about 30 mm.

In another embodiment, said second segment comprises two sheet metal segments attached together by butt-weld. In another embodiment, said second segment comprises two sheet metal segments attached together by lap-weld. In yet another embodiment, said second segment comprises two sheet metal segments that are of equal length. In another embodiment, said two sheet metal segments are separated to form an insulating cavity. In another embodiment, said insulating cavity is filled by an insulating media. In another embodiment, said first approximately cylindrical segment and said second approximately cylindrical segment form an approximately cylindrical shape with a plane forming a common cord formed in part from said second sheet metal segment, and said plane forming a common cord being axially offset from said approximately cylindrical form to avoid weld crossing during the joining of successive partitioned column segments. Another embodiment comprises a method of producing a partitioned column by means of joining successive partitioned columns as discussed herein. Another embodiment comprises a partitioned column as produced by one of the methods discussed herein.

In another embodiment the first sheet metal segment, the second sheet metal segment and the third sheet metal segment may be comprised of different materials. The difference may include, but are not limited to, a different metallic composition or material of the same metallic composition but differing in thickness, surface texture or treatment. In another embodiment, the second sheet metal segment may have mechanical strengthening such as ribbing or the equivalent.

BRIEF DESCRIPTION OF THE FIGURES

Other features and advantages of the invention will appear from a reading of the description that follows. Embodiments of the invention are provided as non-limiting examples.

FIG. 4 is a schematic cross-sectional view of the second sheet metal segment, showing the z-shape profile FIG. 5 is a schematic cross-sectional view showing some of the various embodiments possible for the second sheet metal segment.

FIG. 6 is a schematic cross-sectional view showing one embodiment with an insulating cavity.

FIG. 7 is a schematic cross-sectional view showing one embodiment with the second sheet metal segment offset from the first sheet metal segment and the third sheet metal segment.

FIG. 9 is a schematic cross-sectional view showing one embodiment of possible assembly and welding.

DETAILED DESCRIPTION OF THE INVENTION

The application of dividing wall columns serves to obtain a gain in fabrication cost in processes involving a plurality of columns, particularly in air distillation processes comprising columns operating in parallel: argon columns (mixture and denitrogenation column), Etienne column, or mixture column. In fact, integrating two columns obtains in particular: the economy of a shell, the reduction of the volume of the cold box (in the case of cryogenic distillation), and sometimes, the economy of connecting pipes between the columns. However, the methods for fabricating this type of column are more complex than those for conventional columns.

The present invention describes a method for fabricating dividing wall columns mainly allowing: simpler fabrication of the shell (in particular by limiting the number of internal welds), better sealing between the two parts separated by the partition, and operation with a high pressure differential between the two parts. The invention consists of a method for fabricating a dividing wall column by joining a series of main modules. These main modules have the feature of each consisting of a single elementary part bent on itself, in order to form the outer envelope of the shell and the dividing wall. Secondary modules may be added to supplement the dividing wall column (ends, branches, specific stiffeners, etc.), as well as the column internals (packings, trays, distributors, etc.) and any other part or equipment required for its operation. These additions can be made before, during or after the joining of the main modules.

Figure 1:
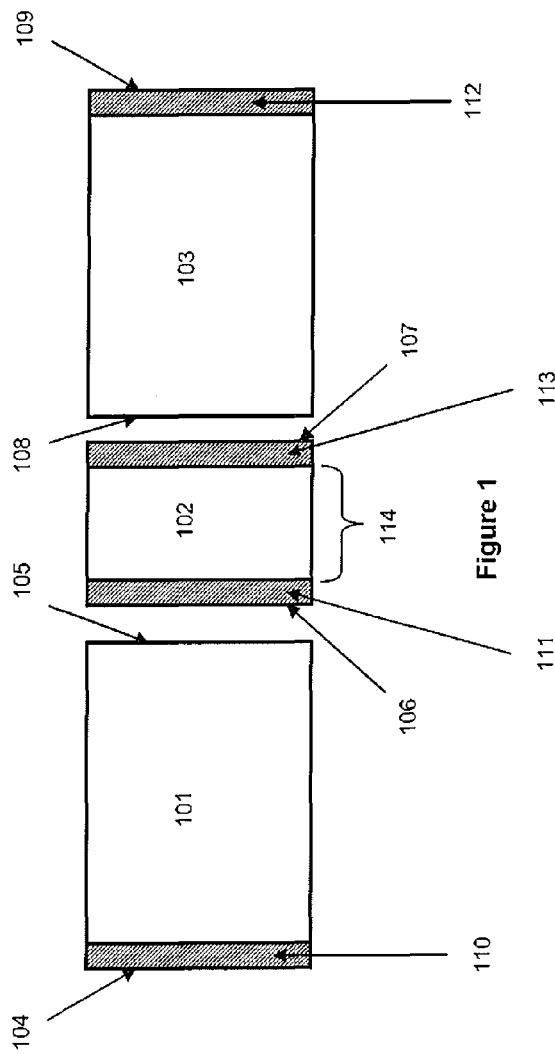
FIG. 1 is a schematic representation of one embodiment of the present invention.
Figure 3:
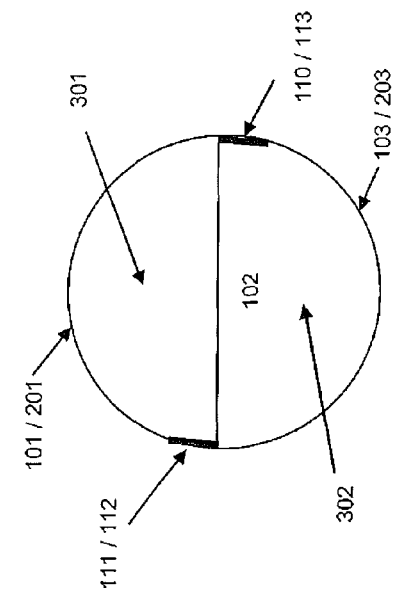
FIG. 3 is a schematic cross-sectional view of one embodiment of the present invention.
Figure 2:
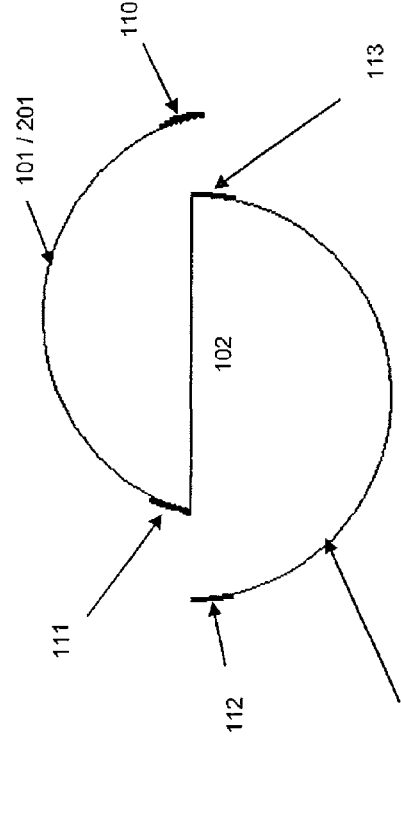
FIG. 2 is a schematic cross-sectional view of one embodiment of the present invention.

One example of the method for fabricating the main module is shown in the FIGS. 1, 2 and 3. Turning first to FIG. 1, the elementary part, consisting of plate metal, is illustrated. This elementary part comprises a first sheet metal segment 101, a second sheet metal segment 102, and a third sheet metal segment 103. For purposes of illustration, these three sheet metal segments 101, 102, 103 are illustrated as being separate pieces, but in various embodiments of the present invention all three segments may comprise a single, unitary piece of metal. The second sheet metal segment 102 may be of a different gauge metal, preferably a thicker gauge, than the first sheet metal segment 101 and/or the third sheet metal segment 103.

First sheet metal segment 101 further comprises a first edge, 104, a second edge 105, and a first distal region 110. Second sheet metal segment 102 further comprises a third edge, 106, a fourth edge 107, a first proximal region, and a second proximal region 113. Third sheet metal segment 103 further comprises a fifth edge, 108, a sixth edge 109, and a second distal region 112.

Turning now to FIG. 2, which maintains the above element numbering in the interest of clarity, first sheet metal segment 101 is bent into first arcuate segment 201, with one end comprising the first distal region 110. Second sheet metal segment 102 is bent into a z-shaped, or s-shaped, form, with the two arms of the comprising the first proximal region 111 and the second proximal region 113. Third sheet metal segment 103 is bent into second arcuate segment 203, with one end comprising the second distal region 112. the arcuate segments 201, 203 may be formed by rolling. The second edge 105 is attached to the third edge 106. The second edge 105 may be attached to the third edge 106 by welding. This may be a butt weld or a lap weld. The second edge 105 may be attached to the third edge 106 by being fabricated from the same sheet. The fourth edge 107 is attached to the fifth edge 108. The fourth edge 107 may be attached to the fifth edge 108 by welding. This may be a butt weld or a lap weld. The fourth edge 107 may be attached to the fifth edge 108 *b* being fabricated from the same sheet.

Turning now to FIG. 3, which also maintains the above numbering in the interest of clarity, first distal region 110 of first arcuate segment 201, is attached to second proximal region 113, thereby forming a first approximately cylindrical segment 301 having an approximately semi-circular cross-section. The second distal region 112 is likewise attached to first proximal region 111, thereby forming a second approximately cylindrical segment 302 having an approximately semi-circular cross-section. The first distal region 110 may be attached to the second proximal region 113 by welding. The second distal region 112 may be attached to the first proximal region 111 by welding. It is preferred that all welds are performed from the exterior of the partitioned column.

Turning now to FIGS. 4a and 4b, which also maintain the above numbering in the interest of clarity, the z-shape of the second sheet metal segment 102 comprises the first proximal region 111 bent into a first arm 401, the second proximal region 113 bent into a second arm 402, and an unbent central region 114. In this embodiment, the first arm 401 and second arm 402 are bent in a clockwise orientation, but a counterclockwise orientation is also possible. A combination of bends that incorporate a counterclockwise and a clockwise orientation (i.e. a c-shaped bend) is also possible. The first arm 401 and second arm 402 may be bent in such a manner as to be imparted with a curve of approximately equal radius to that of the overall column (i.e. an s-shaped cross section). First arm 401 and second arm 402 may be bent in such a manner as to maintain a linear z-shaped cross section.

The z-shape of the second sheet metal segment 102 may be bent so as to have an angle $\alpha$ between the first arm 401 (the first proximal region 111) and the central region 114. The angle $\alpha$ may have an angle of less than 90°. The angle $\alpha$ may have an angle of about 90°. The angle $\alpha$ may have an angle of more than 90°. The z-shape of the second sheet metal segment 102 may be bent so as to have an angle $\beta$ between the second arm 402 (the second proximal region 113) and the central region 114. The angle $\beta$ may have an angle of less than 90 degrees. The angle $\alpha$ may have an angle of about 90 degrees. The angle $\beta$ may have an angle of more than 90 degrees. The first arm 401 may have a length of about 30 mm. The first arm 401 may have a length approximately equal to the diameter of the roller in the forming apparatus. The second arm 402 may have a length of about 30 mm. The second arm 402 may have a length approximately equal to the diameter of the roller in the forming apparatus.

Turning now to FIGS. 5a, 5b, and 5c which also maintain the above numbering in the interest of clarity, the second sheet metal segment 102 may comprise two separate sheets of metal that are subsequently connected together. As indicated in FIG. 5a, the two sheets comprising second sheet metal segment 102 may be attached at their edges, by means of a butt-weld. As indicated in FIG. 5b, the two sheets comprising second sheet metal segment 102 may be overlapped and connected by means of a lap-weld. The degree of overlap is a design choice, but typically the degree of overlap would be less than ½ of the overall length of the central region 114, preferably less than ¼ of the overall length of central region 114. Preferably this overlap would be less than 20 cm, and more preferably this overlap would be less than 10 cm. This technique provides additional structural rigidity by means of the rib created by this overlap butt-weld.

As indicated in FIG. 5c, the two sheets comprising second sheet metal segment 102 may be fully overlapped, with each overlapping segment spanning approximately the full width of central region 114. As indicated in FIG. 6, these two overlapping segments may be separated by a space to form an insulating cavity 501. This insulating cavity may be filled with ambient air, it may be evacuated to form a partial vacuum, or it may be filled with an insulating media.

Turning now to FIGS. 7a and 7b, which also maintain the above numbering in the interest of clarity, the second sheet metal segment 102 may be axially offset Y from the first sheet metal segment 101 and third sheet metal segment 103. As can be seen in FIG. 7b, once the first approximately cylindrical segment 301 and the second approximately cylindrical segment 302 form an approximately cylindrical shape, the second sheet metal segment 102 assumes the nature of a plane forming a common cord within this approximately cylindrical shape. This cord may be a diameter. This cord may be a minor cord, with the first approximately cylindrical segment 301 and the second approximately cylindrical segment 302 being of unequal cross-sectional area. The axial offset Y of the second sheet metal segment 102 results in tab 701 at one end and slot 702 at the other end of the resulting approximately cylindrical segment.

Figure 8B:
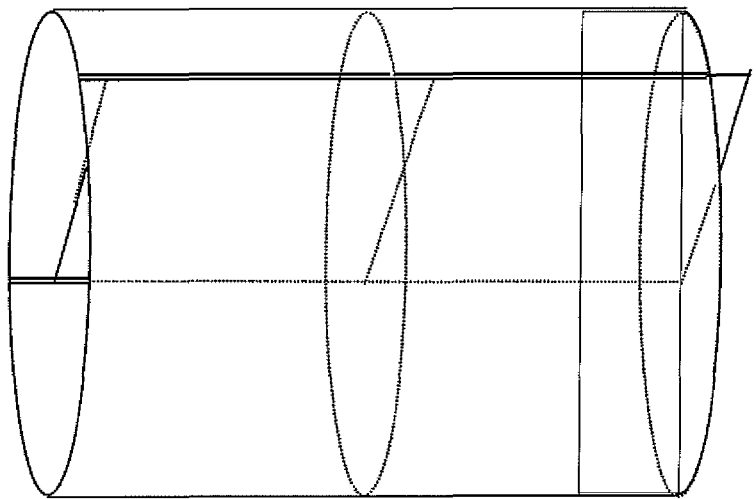
FIG. 8 is a schematic view showing how the completed column segments may be joined successively to form a partitioned column.
Figure 8A:
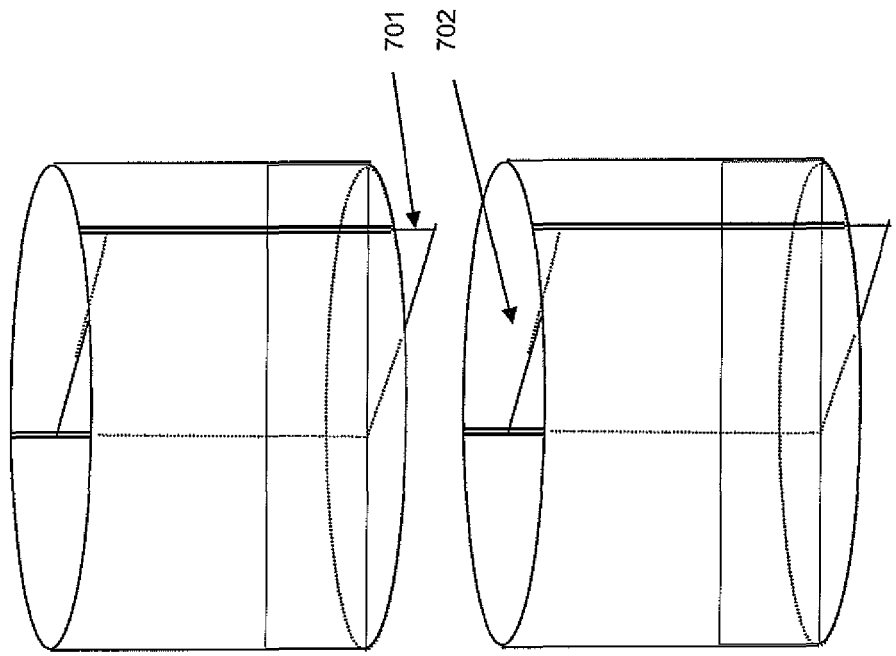
Figure 10B:
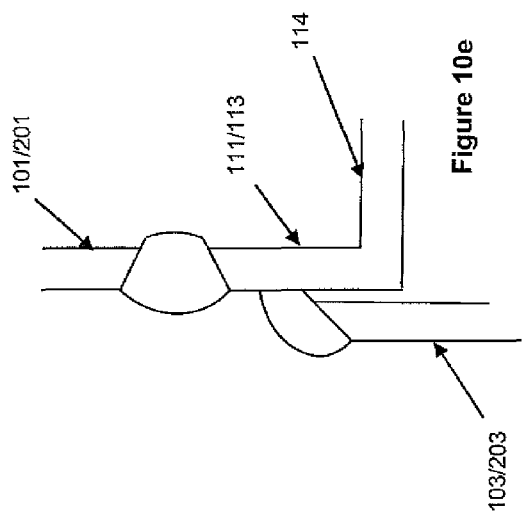
FIG. 10 are schematic details showing other embodiments of possible welding techniques.
Figure 10E:
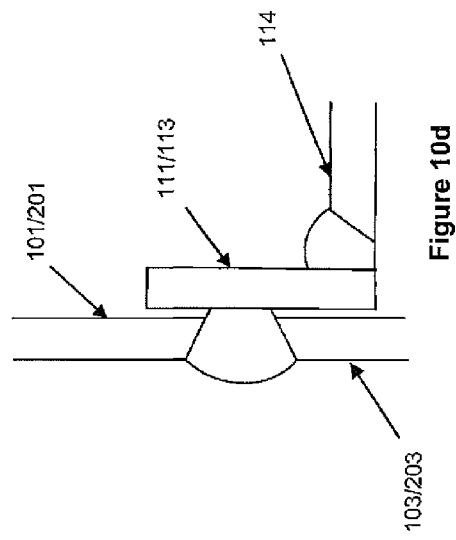
Figure 10C:
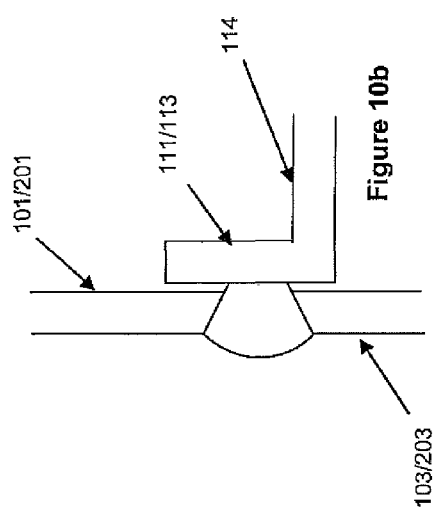
Figure 10D:
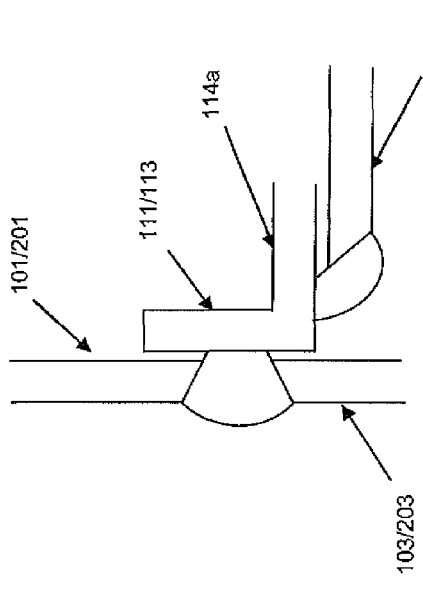

Turning now to FIGS. 8a and 8b, as multiple subassemblies that have been fabricated according to this invention are stacked together, tab 701 of the superior unit fits into slot 702 of the inferior unit, thereby allowing welding without cross welding of any joints. A partitioned column may be fabricated by joining successive partitions of the type described above.

In one alternative of the invention, the main modules may consist of a plurality of elementary parts. The mechanical joining of these parts has the special feature of being carried out with access via the exterior of the part. This alternative therefore allows an easy assembly of the main modules because of the external access and the ease of shaping of the elementary parts. It also serves to guarantee a good seal of the main module with regard to the exterior, and also a good seal between the parts of the column.

The same method can be applied to divide the column into two or more parts. In another alternative, the invention consists in joining the main modules from a single or a plurality of elementary parts, but with at least one mechanical joint made with access from the interior of the elementary part. In another alternative, it is possible to use the method previously described with elementary parts having heterogeneous mechanical characteristics, in particular thicknesses, or heterogeneous materials in the case of metal plates (to better withstand the pressure differentials).

Turning now to FIGS. 9 and 10 (a-d), more details on illustrative embodiments of the above discussed welds are disclosed. Note that, as before, the numbering system has been maintained in the interest of clarity. FIG. 9 illustrates how the unbent central region 114 may have an effectively linear (i.e. effectively non-curved) first proximal region 111 and an effectively linear second proximal region 113. These linear first proximal region 111 and linear second proximal region 114 may then act as conventional backing strips to allow the first sheet metal segment 101 and second sheet metal segment 102 to be more easily welded together.

FIGS. 10 (a-d) illustrate alternative embodiments by which the effectively linear first proximal region 111 and the effectively linear second proximal region 113 may serve as conventional backing strips.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of producing a partitioned column segment, the method comprising the steps of:
   providing a first sheet metal segment, a second sheet metal segment, and a third sheet metal segment;
   wherein said first sheet metal segment comprises a first edge, and a second edge, wherein said second sheet metal segment comprises a third edge, and a fourth edge,
wherein said third sheet metal segment comprises a fifth edge, and an sixth edge,
wherein said second edge is attached to said third edge,
wherein said fourth edge is attached to said fifth edge,
forming said first segment into a first arcuate bend in a first direction, wherein adjacent to said first edge comprises a first distal region;
forming said second segment into a z-shaped bend, wherein said z-shape consists of a first proximate region, a central region, and a second proximate region;
forming said third segment into a second arcuate bend in a second direction, wherein adjacent to said sixth edge comprises a second distal region;
attaching said first distal region to said second proximate region, thereby producing a first cylindrical segment, said first cylindrical segment having an semi-circular cross-section; and
attaching said second distal region to said first proximate region, thereby producing a second cylindrical segment, said second cylindrical segment having an semi-circular cross-section.

2. The method of producing a partitioned column segment of claim 1, wherein;
said second edge is attached to said third edge by being fabricated from the same sheet; and
said fourth edge is attached to said fifth edge by being fabricated from the same sheet.

3. The method of producing a partitioned column segment of claim 1, wherein:
said second edge is attached to said third edge by welding; and
said fourth edge is attached to said fifth edge by welding.

4. The method of producing a partitioned column segment of claim 1, wherein said second sheet metal segment comprises a thicker gauge metal than said first sheet metal segment and/or said third sheet metal segment.

5. The method of producing a partitioned column segment of claim 4, wherein said first sheet metal segment, said second sheet metal segment and said third sheet metal segment are comprised of different material.

6. The method of producing a partitioned column segment of claim 4, wherein the edges may be attached by brazing, rivets or bonding.

7. The method of producing a partitioned column segment of claim 1, wherein:
said first distal region is attached to said second proximate region by welding, and
said second distal region is attached to said first proximate region by welding.

8. The method of producing a partitioned column segment of claim 1, wherein all welds are performed from the exterior of said partitioned column.

9. The method of producing a partitioned column segment of claim 1, wherein:
said z-shaped bend has an angle $\alpha$ between said first proximate region and said central region,
said z-shaped bend has an angle $\beta$ between said second proximate region and said central region.

10. The method of producing a partitioned column segment of claim 7, wherein said proximate regions are straight and form a conventional backing strip.

11. The method of producing a partitioned column segment of claim 9,
wherein said angle $\alpha$ is 90°, and
wherein said angle $\beta$ is 90°.

12. The method of producing a partitioned column segment of claim 1, wherein said second segment comprises two sheet metal segments attached together by butt-weld or lap-weld.

13. The method of producing a partitioned column segment of claim 1, wherein said second segment comprises two sheet metal segments that are of equal length.

14. The method of producing a partitioned column segment of claim 13, wherein said two sheet metal segments are separated to form an insulating cavity.

15. The method of producing a partitioned column segment of claim 1, wherein
said first cylindrical segment and said second cylindrical segment form a cylindrical shape with a plane forming a common cord formed in part from said second sheet metal segment,
wherein said plane forming a common cord being axially offset from said cylindrical form.

16. A method of producing a partitioned column, the method comprising the steps of providing at least two partitioned column segments; and joining the partitioned column segments together to form the partitioned column, wherein the at least two partitioned column segments are produced via the method as claimed in claim 15.

* * * * *